April 10, 1934.  G. W. COLE  1,954,069
DIRECTION INDICATOR
Filed Jan. 28, 1933  2 Sheets-Sheet 1
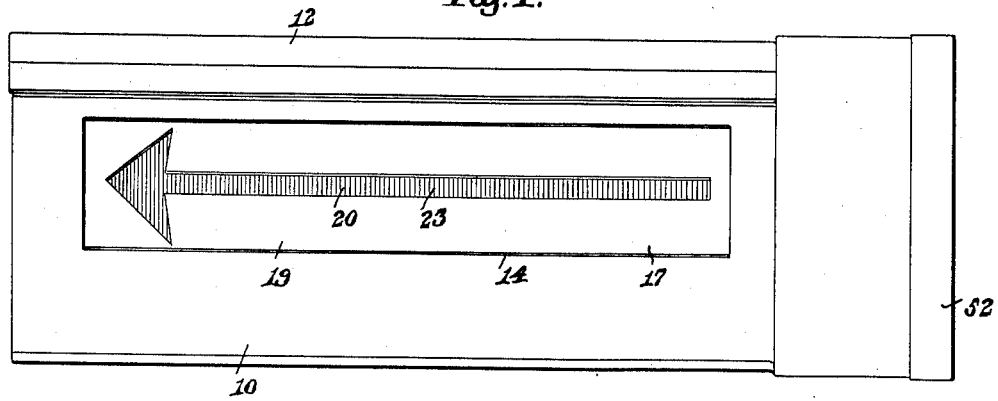
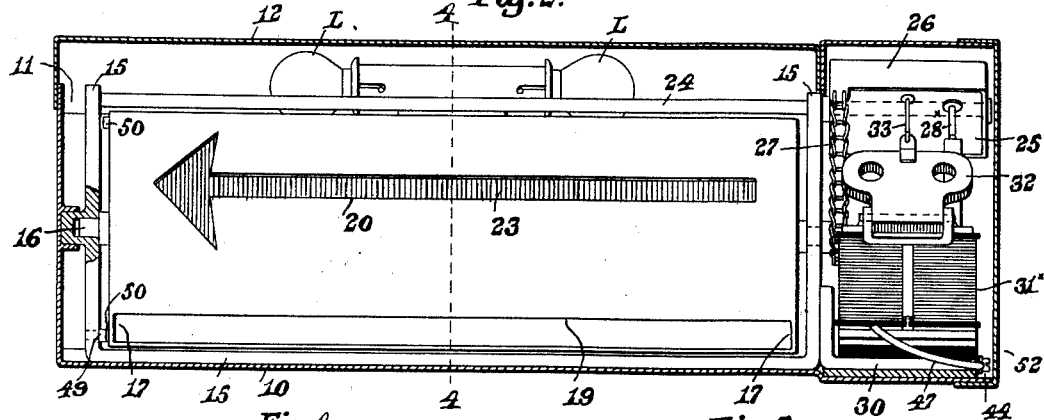
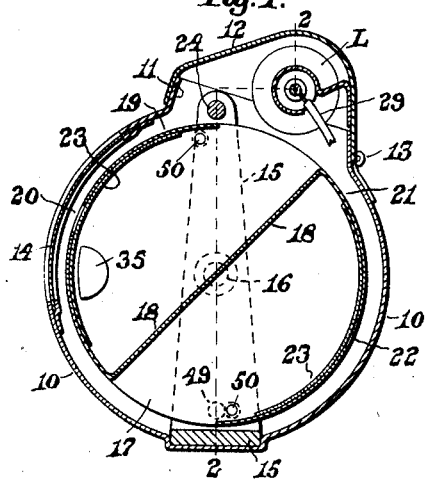
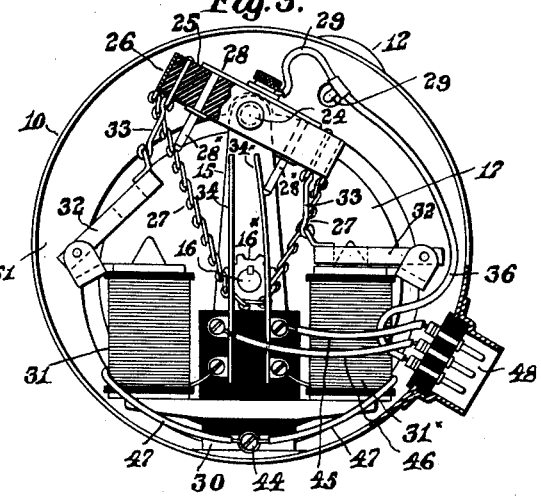
Inventor:
George W. Cole,
by Walter E. Lombard.
Atty.

April 10, 1934.    G. W. COLE    1,954,069
DIRECTION INDICATOR
Filed Jan. 28, 1933    2 Sheets-Sheet 2
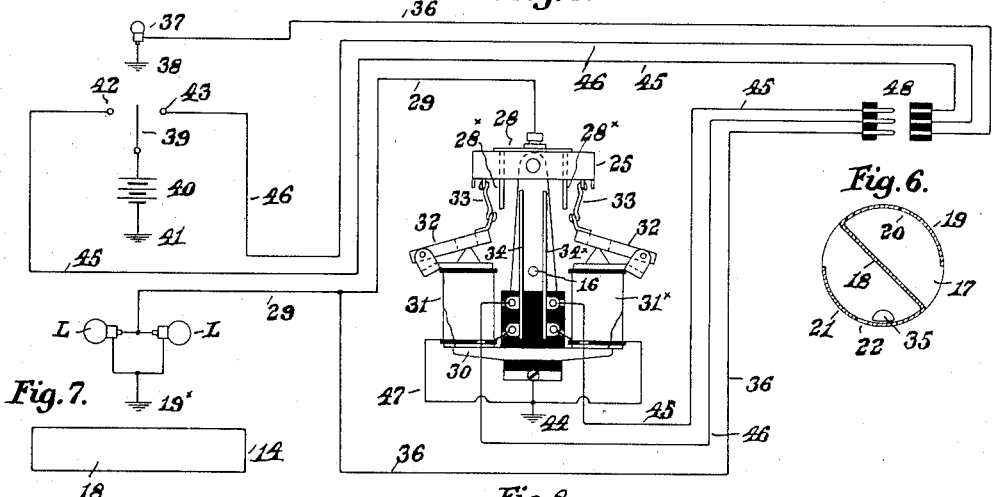
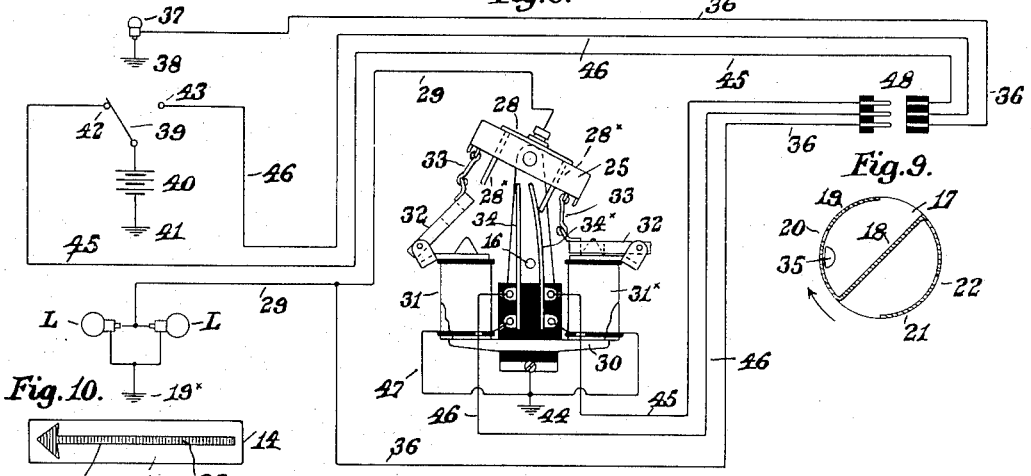
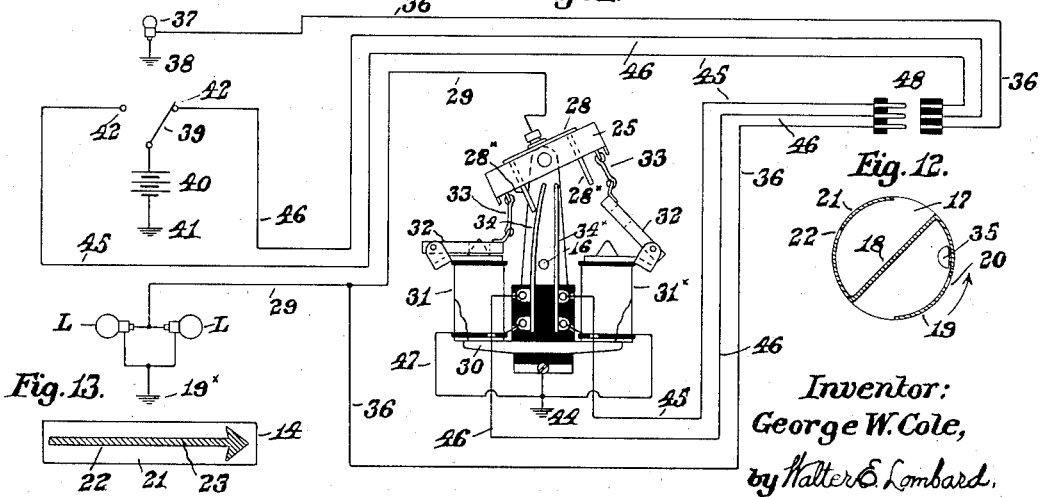
Inventor:
George W. Cole,
by Walter E. Lombard,
Atty.

Patented Apr. 10, 1934

1,954,069

UNITED STATES PATENT OFFICE 1,954,069

DIRECTION INDICATOR

George W. Cole, Sharon, Mass.

Application January 28, 1933, Serial No. 654,022

4 Claims. (Cl. 177—327)

This invention relates to direction indicators for automobiles and has for its object the production of a simple but effective mechanism under the control of the operator which is adapted to pre-warn drivers in the rear of the automobile in which direction said automobile is about to be turned.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Figure 1 represents an elevation of a direction indicator for motor cars, embodying the principles of the present invention.

Figure 2 represents a longitudinal section of same, on line 2, 2 on Fig. 4.

Figure 3 represents an end elevation of same with the end cover removed.

Figure 4 represents a transverse section on line 4, 4 on Fig. 2.

Figure 5 represents a wiring diagram showing the indicator mechanism in neutral position.

Figure 6 represents a transverse section of the rotatable indicating member in its neutral position.

Figure 7 represents the indicator window when the mechanism is in neutral position.

Figure 8 represents a wiring diagram with the mechanism in position to indicate a left turn.

Figure 9 represents a transverse section of the rotatable indicating member in its position when indicating a left turn.

Figure 10 represents the indicator window when a left turn is being indicated.

Figure 11 represents a wiring diagram with the mechanism in position to indicate a right turn.

Figure 12 represents a transverse section of the rotatable indicating member in its position when indicating a right turn, and Figure 13 represents the indicator window when a right turn is being indicated.

Similar characters indicate like parts throughout the several figures of the drawings.

In the drawings, 10 is an elongated casing closed at its opposite ends and having a walled opening 11 in its upper side.

This opening 11 is provided with a cover 12 hinged at 13 to the casing 10 which preferably is cylindrical, as shown in the drawings.

One side of the casing 10 is provided with an elongated transparent window 14 made of celluloid or some similar material.

Disposed within the casing 10 and extending lengthwise thereof is a frame 15 provided with alined bearings in which pintles 16, extending from the ends of an oscillating member 17 within said casing 10, are adapted to oscillate, one of said pintles 16 having secured thereto a sprocket wheel 16×.

The frame 15 is secured in any well known manner to the bottom wall of the casing 10 and is preferably U-shaped.

The member 17 is hollow and is substantially Z-shaped in cross-section as shown in Figs. 4, 6, 9 and 12 of the drawings.

This member 17 is preferably made of opaque sheet metal and covered with a white enamel so that the opposite faces of the inclined portion 18 thereof form reflecting surfaces adapted to deflect light rays through the transparent window 14.

These light rays are produced by electric lamps L disposed in the cover 12 and above the oscillating member 17.

One portion 19 of the member 17 has an opening 20 therein in the shape of an arrow while another portion 21 of said member 17 has a similar opening 22 therein, the arrow openings 20, 22 pointing in opposite directions.

The openings 20, 22 are covered with translucent material 23 and preferably colored.

For instance, the arrow 20 indicating a left turn is colored red and the other arrow 22 is colored green.

When either arrow 20 or 22 is opposite the transparent window 14 the light rays from the lamps L, L will be deflected from the reflecting surface on the inclined portion 18 through the colored arrows 20, 22 and clearly warn the drivers of following cars as to the direction the automobile equipped with the direction indicator is about to turn.

The direction indicator may be applied to the rear of an automobile, or the automobile may be supplied with such devices at front and rear thereof.

Normally the oscillating member 17 is in the position indicated in Fig. 6 and no arrow is exposed to view.

At this time all that can be seen through the window 14 is the plain reflecting surface on the inclined portion 13 and this is true even when the sun is shining thereon in the daytime, or rays from a headlight are directed thereon at night time.

This surface is always of even tone throughout and there can be no bright spots thereon owing to the location of the lamps L, L above the oscilating member 17.

In this position of the member 17 no light rays from the lamps L, L are cast upon the surface 18 as the part 19 is interposed between the lamps and the part 18.

Usually when the lamps are located behind a window in a direction indicator there will be bright spots on the window which make it difficult to see clearly the direction indicating element.

This serious objection is entirely overcome by the construction herein shown and described.

The frame 15 is also provided with bearings in which a shaft 24 is adapted to oscillate.

To an outer end of this shaft 24 is secured a rocker arm 25 made of insulating material surrounded by a metal frame 26.

To the opposite ends of this frame 26 are secured the opposite ends of a chain 27, the center portion of which engages with the teeth of the sprocket wheel 16× so that any rocking motion of the arm 25 will impart an oscillation to the wheel 16× and also to the member 17 on one of the pintles 16 of which said wheel 16× is secured.

Extending through the insulating portion 25 of the rocker arm is a U-shaped member 28, the depending fingers 28× of which form electric contact members.

From this member 28 extends a wire 29 leading to the lamps L, L.

To one end of the frame 15 is secured a plate or shelf 30 on the opposite ends of which are mounted electro-magnets 31, 31× of usual construction and the armatures 32 of which are connected to the opposite ends of the rocker arm 25 by the members 33.

The magnets 31, 31× are insulated for the shelf 30 in the usual manner.

When either magnet 31, 31× is energized and its armature 32 is pulled down, the downward movement of said armature will cause a movement of the rocker arm 25 about the axis of its shaft 24 and this movement will be transmitted through the chain 27 to the sprocket wheel 16× causing a quarter turn of said wheel 16× and a similar movement of the member 17.

This movement of said member 17 will cause an indicating arrow 20 or 22 to be disposed opposite the window 14, it being understood that when one magnet is energized one arrow will be placed in position behind said window and the other arrow will be so positioned when the other magnet is energized.

Secured to and insulated from the shelf or plate 30 and between the magnets 31, 31× are two separated spring metal strips 34, 34× extending upwardly with their upper ends between and in the same vertical plane as the fingers 28×.

The strip 34 is in the electric circuit of the magnet 31 and the strip 34× in the electric circuit of magnet 31×, and as a consequence when either magnet is energized causing the rocking of the arm 25, one of the fingers 28× will contact with one of the spring strips 34, 34× and close the electric circuit to lamps L, L which are grounded at 19×. (See Figs. 5, 8 and 11).

As soon as the energized magnet ceases to function, current thereto having been cut off, the weight 35 on the member 17 will return said member and the rocker arm 25 to their normal positions at the same time breaking the electric circuit to lamps L, L.

The wire 29 leading to lamps L, L has a branch wire 36 leading therefrom to a tell-tale lamp 37 grounded at 38, this lamp 37 being lit whenever the lamp circuit 29 is closed and thereby informing the operator of the car that the lamps L, L are lit, it being understood that the lamp 37 is located on the instrument panel of the car or in some other convenient place where it will constantly be in full view of the car operator.

In convenient reach of the car operator is a switch 39 connected to a battery 40 grounded at 41. (See Figs. 5, 8 and 11).

The switch 39 coacts with either of two contacts 42, 43 in electric circuits to the magnets 31, 31× which are grounded at 44.

The contact 42 is connected by wire 45 to magnet 31× and the contact 43 is connected by wire 46 to the magnet 31.

The magnets 31, 31× are connected together by the wire 47.

The spring strip 34 and magnet 31 are in the same electric circuit 46 and the strip 34× and magnet 31× are in the electric circuit 45.

At 48 the casing 10 has a 3-wire polarity plug of usual construction by which the electric connections may be made readily.

The frame 15 is provided with a stop member 49 projecting therefrom with which the pins 50 on the oscillating member 17 contact when the member 17 has made a quarter turn from its neutral position and brought one of the arrows 20, 22 opposite the window 14.

When the switch 39 contacts with the member 42 (as shown in Fig. 8) the magnet 31× will be energized causing the member 17 to assume the position indicated in Fig. 9 at which time the red arrow 20 will be opposite the window 14 to indicate that a left turn is about to be made. See Fig. 10.

If the switch 39 is moved to the right into contact with member 43, as shown in Fig. 11, the magnet 31 will be energized and moving the member 17 into the position shown in Fig. 12, cause the green arrow 22 to be exposed in the window 14, as shown in Fig. 13.

In other words, when a right turn is to be made the switch 39 is moved to the right and when a left turn is to be made said switch is moved to the left, and in either case the required warning is given to the drivers of cars in the rear.

The electro-magnets 31, 31× and elements associated therewith are confined in a chamber 51 in one end of the casing 10, which chamber 51 is closed by a cover 52.

If desired, one magnet may be located at one end of the casing 10, and the other at the opposite end thereof, without departing from the principle of the invention.

The transparent window 14 of celluloid or similar material is so mounted on the inner face of the casing 10 that dirt is prevented from entering the interior of said casing.

This direction indicator is comparatively simple to construct, is readily mounted on any convenient part of the automobile, and is very effective in operation.

The tell-tale lamp 37 informs the car operator at all times as to whether or not the indicator mechanism is in working condition, and if one of the arrows has been disposed opposite the window 14.

When one of these arrows is thus disposed opposite the window 14, it may be clearly seen by the action of the sunlight thereon or when the rays from a headlight are cast thereon, even if the lamps L, L are not lit.

When the lamps L, L are illuminated and the sunlight or light rays from a headlight are cast on the arrow, the arrow will be clearly seen as the rays from the sun or the rays from the headlight will overcome the illumination of the lamps L, L within the casing.

It is believed that the operation and many advantages of the invention will be understood readily without further description.

Having thus described my invention, I claim:

1. In an automobile direction indicator, a casing having a window therein; a hollow opaque oscillating member within said casing provided with oppositely disposed translucent indicating arrows in the walls thereof, either of said arrows being adapted to be disposed opposite said window; a partition in said member having reflecting surfaces on opposite sides thereof; lighting means above said member and coacting with either of said reflecting surfaces to deflect light rays through one of said translucent arrows when disposed opposite said window; and electro-magnetic means adapted to move said oscillating member to dispose either of said arrows opposite said window.

2. In an automobile direction indicator, a casing having a window therein; a hollow opaque oscillating member within said casing provided with oppositely disposed translucent indicating arrows in the walls thereof, either of said arrows being adapted to be disposed opposite said window, said translucent arrows pointing in opposite directions and having different colors; a partition in said member having reflecting surfaces on opposite sides thereof; lighting means above said member and coacting with either of said reflecting surfaces to deflect light rays through one of said translucent arrows when disposed opposite said window; and electro-magnetic means adapted to move said oscillating member to dispose either of said arrows opposite said window.

3. In an automobile direction indicator, a casing having a window therein; a hollow opaque oscillating member within said casing provided with oppositely disposed translucent indicating arrows in the walls thereof, either of said arrows being adapted to be disposed opposite said window; a partition in said member having reflecting surfaces on opposite sides thereof; lighting means above said member and coacting with either of said reflecting surfaces to deflect light rays through one of said translucent arrows when disposed opposite said window; mechanism including two electro-magnets each adapted to move said oscillating member to dispose one of said arrows opposite said window; and means operable by the car driver for energizing either electro-magnet.

4. In an automobile direction indicator, a casing having a window therein; a hollow opaque oscillating member within said casing provided with oppositely disposed translucent indicating arrows in the walls thereof, either of said arrows being adapted to be disposed opposite said window, said translucent arrows pointing in opposite directions; a partition in said member having reflecting surfaces on opposite sides thereof; electric lamps above said member and coacting with either of said reflecting surfaces to deflect light rays through one of said translucent arrows when disposed opposite said window; mechanism including two electro-magnets each adapted to move said oscillating member to dispose one of said arrows opposite said window; and means operable by the car driver for energizing either electro-magnet and simultaneously lighting said lamps.

GEORGE W. COLE.